US011129114B2

(12) United States Patent
Chen

(10) Patent No.: US 11,129,114 B2
(45) Date of Patent: Sep. 21, 2021

(54) METHOD FOR SOUNDING REFERENCE SIGNAL COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 96 days.

(21) Appl. No.: 16/611,432

(22) PCT Filed: Jun. 23, 2017

(86) PCT No.: PCT/CN2017/089691
§ 371 (c)(1),
(2) Date: Nov. 6, 2019

(87) PCT Pub. No.: WO2018/232719
PCT Pub. Date: Dec. 27, 2018

(65) Prior Publication Data
US 2021/0153140 A1 May 20, 2021

(51) Int. Cl.
*H04W 52/32* (2009.01)
*H04L 5/00* (2006.01)
*H04W 52/24* (2009.01)

(52) U.S. Cl.
CPC ......... *H04W 52/325* (2013.01); *H04L 5/0048* (2013.01); *H04W 52/242* (2013.01)

(58) Field of Classification Search
CPC ............. H04W 52/325; H04W 52/242; H04W 52/146; H04W 52/40; H04W 52/42;
(Continued)

(56) References Cited

U.S. PATENT DOCUMENTS

2014/0126510 A1\* 5/2014 Ogawa ................. H04L 5/0096
370/329
2015/0195063 A1 7/2015 Ro et al.
(Continued)

FOREIGN PATENT DOCUMENTS

CN  102934382 A   2/2013
CN  104272820 A   1/2015
(Continued)

OTHER PUBLICATIONS

European search report issued in corresponding European application No. 17915023.0 dated Apr. 2, 2020.
(Continued)

*Primary Examiner* — Shaima Q Aminzay
(74) *Attorney, Agent, or Firm* — Young Basile Hanlon & MacFarlane, P.C.

(57) ABSTRACT

Provided in implementations of the present disclosure are a wireless communication method and apparatus, configured to take an SRS transmission power into account when selecting an SRS resource from an SRS resource set, so as to select a suitable SRS resource. The method comprises: a terminal apparatus determining a transmission power for sending a sounding reference signal (SRS) by means of an SRS resource in an SRS resource set; and the terminal apparatus indicating first information to a network apparatus, the first information comprising information of the transmission power employed for sending the SRS by means of the SRS resource in the SRS resource set.

18 Claims, 4 Drawing Sheets

(58) Field of Classification Search
CPC ... H04W 52/16; H04W 52/245; H04W 52/28; H04L 5/0048
USPC ........................................................ 455/522
See application file for complete search history.

(56) References Cited

U.S. PATENT DOCUMENTS

2016/0174172 A1    6/2016  Rahman et al.
2019/0349864 A1*  11/2019  Zhang ................. H04W 52/325

FOREIGN PATENT DOCUMENTS

| CN | 104518845 A | 4/2015 |
| CN | 106572478 A | 4/2017 |
| EP | 2916479 A1  | 9/2015 |

OTHER PUBLICATIONS

3GPP TSG RAN WG1 NR Ad-Hoc#2; Qingdao, P.R. China Jun. 27-30, 2017; R1-1710356.
European Examination Report for EP Application 17915023.0 dated Jan. 25, 2021. (6 pages).
Chile First Office Action with English Translation for CL Application 2019003716 dated Feb. 18, 2021. (16 pages).
India First Examination Report for IN Application 201917044998 dated Feb. 23, 2021. (5 pages).
Communication pursuant to Article 94(3) EPC Examination for EP Application 17915023.0 dated Oct. 9, 2020.
Chile Office Action with English Translation for CL Application 2019-003716 dated Apr. 20, 2021. (17 pages).

* cited by examiner

300

310 — The network device acquires first information indicated by the terminal device, wherein the first information includes information about a sending power for sending a Sounding Reference Signal (SRS) by utilizing an SRS resource in a SRS resource group 320 — The network device determines a first SRS resource from the SRS resource group according to the information about the sending power 330 — The network device indicates second information to the terminal device, wherein the second information is used for indicating the first SRS resource, so that the terminal device determines a transmission parameter for sending an uplink signal which is not an SRS according to the first SRS resource

FIG. 3

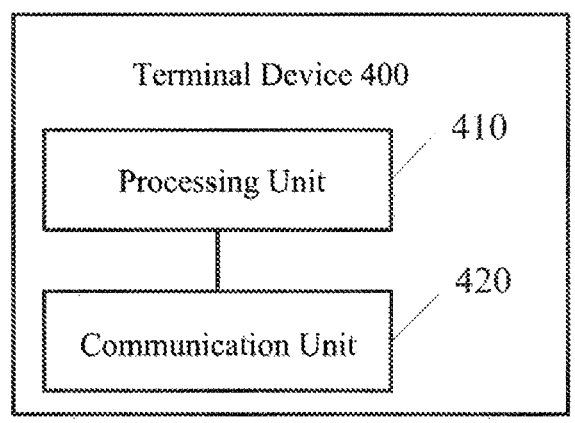

FIG. 4

METHOD FOR SOUNDING REFERENCE SIGNAL COMMUNICATION METHOD AND TERMINAL DEVICE

CROSS-REFERENCE TO RELATED APPLICATION(S)

This application is a 371 application of International Application No. PCT/CN2017/089691, filed on Jun. 23, 2017, the entire disclosure of which is hereby incorporated by reference.

TECHNICAL FIELD

The present disclosure relates to the field of communications, and more particularly, to a radio communication method and device.

BACKGROUND

In a New Radio (NR) system, a network device can select a Sounding Reference Signal (SRS) resource from an SRS resource group based on an SRS sent by a terminal device through an SRS resource in the SRS resource group, wherein the selected SRS resource can optionally be used for beam management.

Implementations of the present disclosure provide a solution, which can realize selection of a more appropriate SRS resource.

SUMMARY

Implementations of the present disclosure provide a wireless communication method and apparatus.

In a first aspect, a wireless communication method is provided. The method includes: determining, by a terminal device, a sending power for sending an Sounding Reference Signal (SRS) by utilizing an SRS resource in an SRS resource group; indicating, by the terminal device, first information to a network device, wherein the first information includes information about the sending power for sending the SRS by utilizing the SRS resource in the SRS resource group.

In combination with the first aspect, in a possible implementation of the first aspect, the method further includes: acquiring, by the terminal device, second information indicated by the network device, wherein the second information is used for indicating a first SRS resource in the SRS resource group; determining, by the terminal device, a transmission parameter for sending a first uplink signal which is not an SRS according to the first SRS resource.

In combination with the first aspect or any of the above possible implementations, in another possible implementation of the first aspect, the transmission parameter includes at least one of the following: a sending beam, a quantity of transmitting ports, and a precoding matrix.

In combination with the first aspect or any one of the above possible implementations, in another possible implementation of the first aspect, the information about the sending power includes: a quantized value of the sending power for sending the SRS by utilizing the SRS resource in the SRS resource group.

In combination with the first aspect or any one of the above possible implementations, in another possible implementation of the first aspect, the information about the sending power includes: a relative value of the sending power for sending the SRS by utilizing the SRS resource in the SRS resource group relative to a first sending power.

In combination with the first aspect or any one of the above possible implementations, in another possible implementation of the first aspect, the first sending power is: a sending power of a second uplink signal which is not an SRS; or, a sending power for sending the SRS by utilizing a second SRS resource in the SRS resource group; or, an average sending power for sending SRSs by utilizing SRS resources in the SRS resource group; or, a reference sending power configured by the network device.

In combination with the first aspect or any one of the above possible implementations, in another possible implementation of the first aspect, the second SRS resource is an agreed SRS resource in the SRS resource group.

In combination with the first aspect or any one of the above possible implementations, in another possible implementation of the first aspect, the information about the sending power includes: information for indicating whether a same sending power is adopted for sending SRSs on different SRS resources in the SRS resource group.

In combination with the first aspect or any one of the above possible implementations, in another possible implementation of the first aspect, determining, by the terminal device, the sending power for sending the SRS using the SRS resource in the SRS resource group, includes: utilizing independent path loss values to calculate the sending power for sending the SRS for different SRS resources in the SRS resource group.

In combination with the first aspect or any one of the above possible implementations, in another possible implementation of the first aspect, the information of the sending power includes: information about a path loss estimation value used for calculating the sending power.

In combination with the first aspect or any one of the above possible implementations, in another possible implementation of the first aspect, the information about the path loss estimation value is: a quantized value of the path loss estimation value; or, a relative value of the path loss estimation value relative to a first path loss estimation value.

In combination with the first aspect or any one of the above possible implementations, in another possible implementation of the first aspect, the first path loss estimation value is: a path loss estimation value used for calculating a sending power of a second uplink signal which is not an SRS; or, a path loss estimation value used for calculating a sending power for sending the SRS by utilizing a second SRS resource in the SRS resource group; or, a reference path loss estimation value configured by the network device.

In combination with the first aspect or any one of the above possible implementations, in another possible implementation of the first aspect, indicating, by the terminal device, the first information to the network device, includes: sending, by the terminal device, the first information through an uplink physical channel; or, sending, by the terminal device, the first information through high-level signaling; or, indicating, by the terminal device, the first information through the SRS resource used for sending the SRS, wherein the SRS resource used for sending the SRS has a corresponding relationship with the first information.

In combination with the first aspect or any one of the above possible implementations, in another possible implementation of the first aspect, determining, by the terminal device, the sending power for sending the SRS by utilizing the SRS resource in the SRS resource group, includes: utilizing independent power control parameters to calculate the sending power for sending the SRS for different SRS resources in the SRS resource group.

In combination with the first aspect or any one of the above possible implementations, in another possible implementation of the first aspect, the power control parameter includes an open loop power control parameter and/or a closed loop power control parameter.

In combination with the first aspect or any one of the above possible implementations, in another possible implementation of the first aspect, the method further includes: sending SRSs on different SRS resources in the SRS resource group, by utilizing different sending beams.

In a second aspect, a radio communication method is provided. The method includes: acquiring, by a network device, first information indicated by a terminal device, wherein the first information includes information about a sending power for sending a Sounding Reference Signal (SRS) by utilizing an SRS resource in a SRS resource group; determining, by the network device, a first SRS resource from the SRS resource group according to the information about the sending power; indicating, by the network device, second information to the terminal device, wherein the second information is used for indicating the first SRS resource, so that the terminal device determines a transmission parameter for sending an uplink signal which is not an SRS according to the first SRS resource.

In combination with the second aspect, in a possible implementation of the second aspect, the transmission parameter includes at least one of the following: a sending beam, a quantity of transmitting ports, and a precoding matrix.

In combination with the second aspect or any one of the above possible implementations, in another possible implementation of the second aspect, the information about the sending power includes: a quantized value of the sending power for sending the SRS by utilizing the SRS resource in the SRS resource group; or, a relative value of the sending power for sending the SRS by utilizing the SRS resource in the SRS resource group relative to a first sending power; or, information for indicating whether a same sending power is adopted for sending SRSs on different SRS resources in the SRS resource group; or, information about a path loss estimation value used for calculating the sending power.

In combination with the second aspect or any one of the above possible implementations, in another possible implementation of the second aspect, the information about the path loss estimation value used for calculating the sending power includes: a quantized value of the path loss estimation value; or, a relative value of the path loss estimation value relative to a first path loss estimation value.

In combination with the second aspect or any one of the above possible implementations, in another possible implementation of the second aspect, acquiring, by the network device, the first information indicated by the terminal device, includes: receiving, by the network device, the first information sent by the terminal device through an uplink physical channel; or, receiving, by the network device, the first information sent by the terminal device through high-level signaling; or, acquiring, by the network device, the first information indicated by the terminal device through the SRS resource used by the terminal device to send the SRS, wherein the SRS resource used by the terminal device to send the SRS has a corresponding relationship with the first information.

In combination with the second aspect or any one of the above possible implementations, in another possible implementation of the second aspect, determining, by the network device, the first SRS resource from the SRS resource group according to the information about the sending power, includes: determining the first SRS resource according to receiving powers of receiving SRSs on different SRS resources in the SRS resource group and the information about the sending power.

In a third aspect, a terminal device is provided, which is used for performing the method in the above first aspect or any possible implementation mode of the first aspect. Specifically, the terminal device includes function modules used for executing the method in the first aspect or any possible implementation mode of the first aspect described above.

In a fourth aspect, a network device is provided, which is used for performing the method in the above second aspect or any possible implementation mode of the second aspect. Specifically, the terminal device includes function modules for performing the method in the second aspect or in any possible implementation of the second aspect described above.

In a fifth aspect, a terminal device is provided, which includes a processor, a memory, and a transceiver. The processor, the memory, and the transceiver communicate with each other through internal connection paths to transfer control and/or data signals, so that the network device performs the method in the first aspect or any possible implementation of the first aspect described above.

In a sixth aspect, a network device is provided, which includes a processor, a memory, and a transceiver. The processor, the memory, and the transceiver communicate with each other through internal connection paths to transfer control and/or data signals, so that the network device implements the method in the second aspect or any possible implementation mode of the second aspect described above.

In a seventh aspect, a computer readable medium for storing a computer program is provided. The computer program includes instructions for executing any method or any possible implementation of the method described above.

In an eighth aspect, a computer program product containing instructions is provided. When running on a computer, the computer program product causes the computer to execute any method or the method in any possible implementation described above.

BRIEF DESCRIPTION OF DRAWINGS

To describe the technical solution of implementations of the present disclosure more clearly, accompanying drawings that need to be used in the description of implementations or the prior art will be briefly introduced below. It is apparent that the accompanying drawings described below are only some implementations of the present disclosure; and for a person of ordinary skill in the art, other drawings may be acquired according to these drawings without paying an inventive effort.

FIG. 3 is a schematic flowchart of a wireless communication method according to an implementation of the present disclosure.

FIG. 4 is a schematic block diagram of a terminal device according to an implementation of the present disclosure.

DETAILED DESCRIPTION

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

Technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a future 5G system (also can be referred to as a New Radio (NR) system), or the like.

Figure 1:
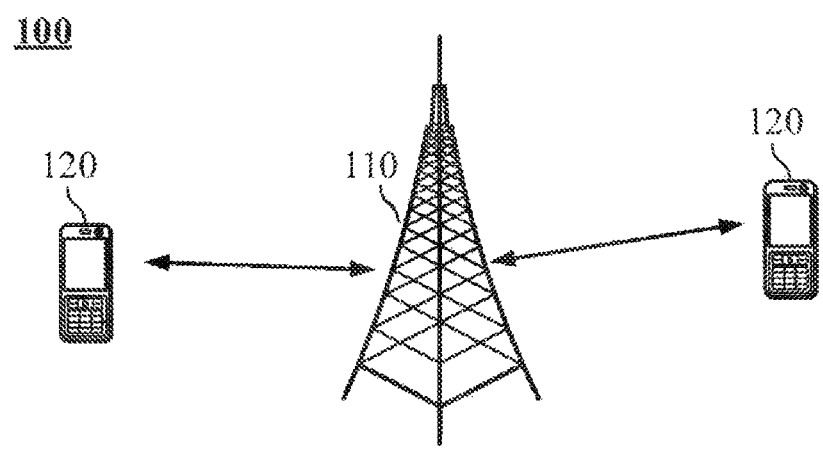
FIG. 1 is a schematic diagram of a wireless communication system according to an implementation of the present disclosure.

FIG. 1 shows a wireless communication system 100 to which an implementation of the present disclosure is applied. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, terminal direct connection (Device to Device, D2D) communication may be performed between the terminal devices 120.

Optionally, the 5G system or network may also be referred to as a New Radio (NR) system or network.

FIG. 1 exemplifies one network device and two terminal devices. Optionally, the wireless communication system 100 may include multiple network devices, and another quantity of terminal devices may be included within the coverage area of each network device, which is not limited in implementations of the present disclosure.

Optionally, the wireless communication system 100 may further include other network entities such as a network controller, a mobile management entity, and implementations of the present disclosure are not limited thereto.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
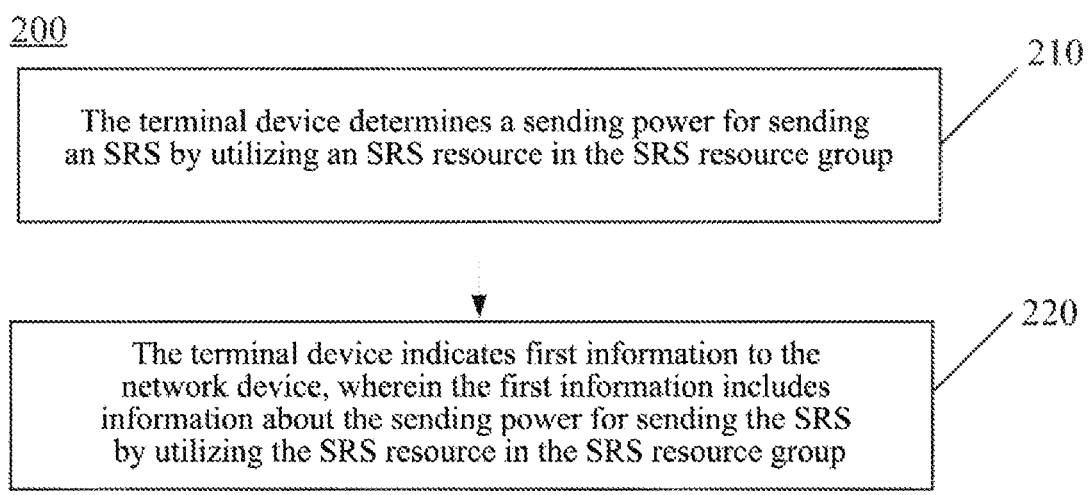
FIG. 2 is a schematic flowchart of a wireless communication method according to an implementation of the present disclosure.

FIG. 2 is a schematic flowchart of a wireless communication method 200 according to an implementation of the present disclosure. The method 200 may optionally be applied to, but not limited to, the system shown in FIG. 1. The method 200 includes at least part of the following contents.

In 210, a terminal device determines a sending power for sending an SRS by utilizing an SRS resource in an SRS resource group.

Optionally, the SRS resource in the SRS resource group may include multiple SRS resources.

Optionally, each SRS resource in the multiple SRS resources is independent of a parameter configuration of other SRS resources, which may specifically include at least one of the following parameter configurations: a time domain resource occupied for sending the SRS; a frequency domain resource occupied for sending the SRS; an SRS sequence used for sending the SRS; a quantity of times that SRSs are sent after trigger signaling sent by the network device is received, or the like. The network side can allocate a configuration parameter for each SRS resource through independent signaling.

In 220, the terminal device indicates first information to the network device, wherein the first information includes information about the sending power for sending the SRS by utilizing the SRS resource in the SRS resource group.

Specifically, the terminal device may send SRSs by utilizing multiple SRS resources, and the network device may select an SRS resource whose channel quality satisfies a condition from the multiple SRS resources with reference to received signal strengths (e.g., receiving powers) of received SRSs when selecting the SRS resource according to the SRSs sent by the terminal device through the multiple SRS resources.

If the terminal device adopts different sending powers when sending SRSs by utilizing different SRS resources, then selection of the SRS resource by the network device will be affected. Therefore, the terminal device can indicate the information of the sending power for sending the SRS by using each SRS resource in the multiple SRS resources to the network device, so that the network device can combine the information of the sending power indicated by the terminal device to make more accurate selection of the SRS resource when selecting the SRS resource.

Optionally, in an implementation of the present disclosure, the network device may indicate a first SRS resource to the terminal device through second information, after selecting the first SRS resource from the multiple SRS resources in combination with the information of the sending power indicated by the first information.

Optionally, the terminal device may acquire the second information indicated by the network device, wherein the second information is used for indicating the first SRS resource in the SRS resource group; the terminal device determines a transmission parameter for sending a first uplink signal which is not an SRS according to the first SRS resource.

Specifically, the network device can determine an SRS resource with a better channel quality as the first SRS resource, and indicate the first SRS resource to the terminal device through the second information. The terminal device can know that the channel quality corresponding to the first SRS resource is better according to the second information, and can determine the transmission parameter used for transmitting the SRS on the first SRS resource as a transmission parameter for sending other uplink signals.

Herein, the transmission parameter optionally includes at least one of the following: a sending beam, a quantity of transmitting ports, and a precoding matrix.

Optionally, the first SRS resource may include one SRS resource or multiple SRS resources. When the first SRS resource includes multiple SRS resources, one SRS resource can be, for example, randomly or preferentially, selected, and a transmission parameter used by the selected one SRS resource can be determined as a transmission parameter for sending other uplink signals, or a transmission parameter can be obtained based on the SRS resource.

It should be understood that in an implementation of the present disclosure, the network device can also indicate an SRS resource with a poor channel quality to the terminal device, then the terminal device can avoid adopting a transmission parameter used for transmitting an SRS on the SRS resource to transmit other uplink signals.

Optionally, in an implementation of the present disclosure, uplink beam management, including sending beam management and receiving beam management, can be performed based on an SRS.

For the management of sending beams, the terminal device will adopt different sending beams to send SRSs on different SRS resources in multiple SRS resources. The network device can select at least one SRS resource based on received signal strengths on the multiple SRS resources to indicate to the terminal device, thus enabling the terminal device to transmit data by adopting a beam corresponding to the SRS resource.

For the management of receiving beams, the terminal device will adopt the same beam to send SRSs on multiple SRS resources. The network device receives SRS signals on multiple SRS resources based on different receiving beams, and select a receiving beam for receiving data according to received signal strengths.

Optionally, in an implementation of the present disclosure, when performing the sending beam management, the terminal device can adopt different sending powers and utilize different sending beams to send SRSs on different SRS resources.

Optionally, when performing the sending beam management, the network device may determine the SRS resource of which a difference between the sending power and the receiving power satisfies a predetermined condition (e.g., the difference is minimum, or the difference is less than or equal to a predetermined value) as the first SRS resource.

Optionally, in an implementation of the present disclosure, when performing the receiving beam management, the terminal device can adopt a same sending power and utilize a same sending beam to send SRSs on different SRS resources.

Optionally, in an implementation of the present disclosure, the information of the sending power included in the first information may include: information for indicating whether a same sending power is adopted to send SRSs on different SRS resources in the SRS resource group to the network device.

Specifically, when the first information indicates that the same sending power is adopted to send the SRSs on the different SRS resources, then the network device can ignore influence of the sending power and select a resource only according to reception performance when selecting the resource based on each SRS resource.

Or, when the first information indicates that the same sending power is not adopted to send the SRSs on the different SRS resources, the network device can further acquire powers, or relative values, adopted for sending an SRS on each SRS resource, so that the sending power can be considered when selection of an SRS resource is performed.

It should be understood that the information for indicating whether the same sending power is adopted to send the SRSs on the different SRS resources in the SRS resource group to the network device can also play other roles, for example, for the network device to determine whether to perform the receiving beam management or the sending beam management. For example, when powers are the same, the receiving beam management is performed, and when the powers are different, the sending beam management is performed.

It should be understood that in an implementation of the present disclosure, the same sending power is not adopted to send the SRSs on the different SRS resources refers to that, it can exist that sending powers adopted to send SRSs on partial SRS resources may be the same, or sending powers adopted to send SRSs on any two SRS resources are different.

Optionally, in an implementation of the present disclosure, the information of the sending power for sending the SRS by utilizing the SRS resource in the SRS resource group includes: a quantized value of the sending power for sending the SRS by utilizing the SRS resource in the SRS resource group.

Specifically, the terminal device can directly indicate a quantized value of an actual sending power for sending the SRS by utilizing the SRS resource in the SRS resource group to the network device.

Optionally, the network device and the terminal device may agree on some quantized values in advance, and the terminal device may select the quantized value from the agreed quantized values according to an actual sending power and report the selected quantized value.

Optionally, in an implementation of the present disclosure, the terminal device may indicate a relative value of the sending power for sending the SRS by utilizing the SRS resource (specifically, each SRS resource) in the SRS resource group relative to a first sending power to the network device.

Optionally, a relative power value refers to a difference between a power for sending an SRS by using one SRS resource in the SRS resource group and a first sending power, in units of dB.

Optionally, in an implementation of the present disclosure, the terminal device indicates a difference between a power for sending an SRS and a first sending power to the network device. Since a numerical value of the difference may be small, a field occupied for reporting is small, thus signaling overhead can be saved.

Optionally, the relative power value may indicate a quantized value of a power difference, the network device and the terminal device may agree on some quantized values in advance, and the terminal device may select a quantized value from the agreed quantized values according to an actual power difference and report the selected quantized value.

It should be understood that the relative value may also be a ratio of a power for sending an SRS by utilizing one SRS resource in the SRS resource group to a first sending power.

Optionally, the first sending power is a sending power of a second uplink signal which is not an SRS.

Specifically, the second uplink signal may be a data signal (e.g., a signal carried by a Physical Uplink Shared Channel (PUSCH)) or a control signal (e.g., a signal carried by a Physical Uplink Control Channel (PUCCH)) or a signal carried by a Physical Random Access Channel (PRACH). The second uplink signal may be a signal sent before indicating the first information to the network device, or a signal before sending the SRS to the network device through the SRS resource in the SRS resource group.

Optionally, the first sending power is a sending power for sending an SRS by using a second SRS resource in the SRS resource group. The second SRS resource is optionally an agreed SRS resource in the SRS resource group.

Specifically, the second SRS resource may be the first SRS resource in the SRS resource group (i.e., the SRS resource with the lowest SRS resource index), or the last SRS resource in the SRS resource group (i.e., the SRS resource with the highest SRS resource index), or the SRS resource with the lowest sending power in the SRS resource group, or the SRS resource with the highest sending power in the SRS resource group, or the SRS resource with the middle sending power in the SRS resource group.

Optionally, the agreed SRS resource may be agreed between the terminal device and the network device through information interchange, or may be agreed by a protocol (for example, preset on the terminal device after manufacture).

Optionally, the first sending power is an average sending power for sending SRSs by using SRS resources in the SRS resource group.

Herein, the average sending power refers to a sending power obtained by averaging powers for sending SRSs by using multiple SRS resources in the SRS resource group. For example, the multiple SRS resources include SRS resource A and SRS resource B. If a sending power linear value of the SRS resource A is a and a sending power linear value of the SRS resource B is b, then an average power is (a+b)/2.

Optionally, the first sending power is a reference sending power configured by the network device.

Optionally, in an implementation of the present disclosure, the terminal device may indicate information of a path loss estimation value used for calculating the sending power for sending the SRS using the SRS resource in the SRS resource group to the network device.

Optionally, the information of the path loss estimation value is a quantized value of the path loss estimation value.

Optionally, the network device and the terminal device can agree on some quantized values in advance, and the terminal device can select a quantized value from the agreed quantized values according to an actual path loss estimation value and report the selected quantized value.

Optionally, the information of the path loss estimation value is a relative value of the path loss estimation value relative to a first path loss estimation value.

Optionally, the first path loss estimation value is a path loss estimation value used for calculating a sending power of a second uplink signal which is not an SRS.

Specifically, the second uplink signal may be a data signal (e.g., a signal carried by a PUSCH) or a control signal (e.g., a signal carried by a PUCCH) or a signal carried by a PRACH. The second uplink signal may be a signal sent before indicating the first information to the network device, or a signal before sending the SRS to the network device through the SRS resource in the SRS resource group.

Optionally, the first path loss estimation value is a path loss estimation value used for calculating the sending power for sending the SRS by using the second SRS resource in the SRS resource group.

Specifically, the second SRS resource may be the first SRS resource in the SRS resource group (i.e., the SRS resource with the lowest SRS resource index), or the last SRS resource in the SRS resource group (i.e., the SRS resource with the largest SRS resource index), or the SRS resource with the lowest sending power in the SRS resource group, or the SRS resource with the highest sending power in the SRS resource group, or the SRS resource with the middle sending power in the SRS resource group.

Optionally, the first path loss estimation value is a reference path loss estimation value configured by the network device. For example, the network side may estimate an uplink path loss value through an uplink signal, and notify the terminal of an estimated uplink path loss value through signaling as a reference path loss estimation value. The terminal reports a relative value of an estimated downlink path loss value relative to the reference path loss estimation value to the network side.

Therefore, in an implementation of the present disclosure, the terminal device reports information of a path loss estimation value used for calculating the sending power when sending the SRS to the network device, so that the network device can select an SRS resource from the SRS resource group in combination with the information of the path loss estimation value, for the terminal device to determine a transmission parameter for sending an uplink signal which is not an SRS.

Optionally, in an implementation of the present disclosure, independent path loss values are adopted to calculate sending powers for sending SRSs for different SRS resources in the SRS resource group.

Optionally, in an implementation of the present disclosure, when the terminal device determines an uplink sending power, it needs to perform measurement of a downlink path loss based on a downlink signal (downlink Synchronization Signal (SS) or Channel State Information Reference Signal (CSI-RS)), and determine an uplink sending power after performing path loss compensation according to the downlink path loss. The terminal device can utilize downlink signals (SSs or CSI-RSs) sent by different resources to perform the measurement of the downlink path loss.

Optionally, path loss estimation values of sending powers can be independently estimated and calculated for different SRS resources.

Optionally, the terminal device indicates the first information through the SRS resource used for sending the SRS, wherein the SRS resource used for sending the SRS has a corresponding relationship with the first information.

Specifically, i.e., the network device configures multiple different SRS resources for the terminal device, wherein sending powers corresponding to some SRS resources are the same, and sending powers corresponding to some SRS resources can be different, and the network device determines whether a same sending power is adopted through which SRS resources are adopted by the terminal to send SRSs.

Or, each SRS resource may correspond to one sending power, and when determining that an SRS needs to be sent through a certain power, the network device may select the SRS resource corresponding to the power to send the SRS. Or when determining that an SRS needs to be sent through a certain SRS resource, the terminal device may select a power corresponding to the SRS resource to send the SRS.

It should be understood that the first information can be sent to the network device through an uplink physical channel or high-level signaling.

Optionally, in an implementation of the present disclosure, independent power control parameters are adopted to calculate the sending power for sending SRS for different SRS resources in the SRS resource group.

Herein the power control parameter optionally includes an open loop power control parameter and/or a closed loop power control parameter.

For example, the open-loop power control parameter may include a target power P_o,SRS, and the closed-loop power control parameter may be a closed-loop power adjustment value.

Optionally, power control parameters for calculating sending powers may be the same or different for different SRS resources.

FIG. 3 is a schematic flowchart of a wireless communication method 300 according to an implementation of the present disclosure. The method 300 may include at least part of the following contents.

In 310, the network device acquires first information indicated by the terminal device, wherein the first information includes information of a sending power for sending a Sounding Reference Signal (SRS) by utilizing an SRS resource in a SRS resource group.

Optionally, the network device receives the first information sent by the terminal device through an uplink physical channel.

Optionally, the network device receives the first information sent by the terminal device through high-level signaling.

Optionally, the network device acquires the first information indicated by the terminal device through the SRS resource used by the terminal device to send the SRS, wherein the SRS resource used by the terminal device to send the SRS has a corresponding relationship with the first information.

Optionally, information of the sending power includes: a quantized value of the sending power for sending the SRS utilizing the SRS resource in the SRS resource group; or, a relative value of the sending power for sending the SRS by utilizing the SRS resource in the SRS resource group relative to a first sending power; or, information for indicating whether a same sending power is adopted for sending SRSs on different SRS resources in the SRS resource group; or, information of a path loss estimation value used for calculating the sending power.

Herein the information of the path loss estimation value used for calculating the sending power optionally includes: a quantized value of the path loss estimation value; or, a relative value of the path loss estimation value relative to a first path loss estimation value.

In 320, the network device determines a first SRS resource from the SRS resource group according to the information of the sending power.

In 330, the network device indicates second information to the terminal device, wherein the second information is used for indicating the first SRS resource, so that the terminal device determines a transmission parameter for sending an uplink signal which is not an SRS according to the first SRS resource.

Optionally, the transmission parameter includes at least one of the following: a sending beam, a quantity of transmitting ports, and a precoding matrix.

Optionally, the first SRS resource is determined according to receiving powers of SRSs received on different SRS resources in the SRS resource group and the information of the sending power.

It should be understood that the description in the method 300 may refer to the method 200, and will not be repeated here for the sake of brevity.

Therefore, in an implementation of the present disclosure, the terminal device can indicate information of a sending power for sending an SRS by utilizing each SRS resource in the SRS resource group to the network device, so that the network device can, in combination with the information of the sending power indicated by the terminal device, select a more appropriate SRS resource when selecting an SRS resource from the SRS resource group.

FIG. 4 is a schematic block diagram of a terminal device 400 according to an implementation of the present disclosure. As shown in FIG. 4, the terminal device 400 includes a processing unit 410 and a communication unit 420.

The processing unit 410 is used for determining a sending power for sending a Sounding Reference Signal (SRS) by utilizing an SRS resource in a SRS resource group; the communication unit 420 is used for indicating first information to a network device, wherein the first information includes information of the sending power for sending the SRS by utilizing the SRS resource in the SRS resource group.

Optionally, the communication unit 420 is further used for: acquiring second information indicated by the network device, wherein the second information is used for indicating a first SRS resource in the SRS resource group; the processing unit 420 is further used for determining a transmission parameter for sending a first uplink signal which is not an SRS according to the first SRS resource.

Optionally, the transmission parameter includes at least one of the following: a sending beam, a quantity of transmitting ports, and a precoding matrix.

Optionally, the information of the sending power includes: a quantized value of the sending power for sending the SRS by utilizing the SRS resource in the SRS resource group.

Optionally, the information of the sending power includes: a relative value of the sending power for sending the SRS by utilizing the SRS resource in the SRS resource group relative to a first sending power.

Optionally, the first sending power is: a sending power of a second uplink signal which is not an SRS; or, a sending power for sending an SRS by utilizing a second SRS resource in the SRS resource group; or, an average sending power for sending SRSs using SRS resources in the SRS resource group; or, a reference sending power configured by the network device.

Optionally, the second SRS resource is an agreed SRS resource in the SRS resource group.

Optionally, the information of the sending power includes: information for indicating whether a same sending power is adopted to send SRSs on different SRS resources in the SRS resource group.

Optionally, the processing unit 410 is further used for: utilizing independent path loss values to calculate the sending power for sending the SRS for different SRS resources in the SRS resource group.

Optionally, the information of the sending power includes: information of a path loss estimation value used for calculating the sending power.

Optionally, the information of the path loss estimation value is: a quantized value of the path loss estimation value; or, a relative value of the path loss estimation value relative to a first path loss estimation value.

Optionally, the first path loss estimation value is: a path loss estimation value used for calculating a sending power of a second uplink signal which is not an SRS; or, a path loss estimation value used for calculating a sending power for sending an SRS by utilizing a second SRS resource in the SRS resource group; or, a reference path loss estimation value configured by the network device.

Optionally, the communication unit 420 is further used for: sending the first information through an uplink physical channel; or, sending the first information through high-level signaling; or, indicating the first information by the SRS resource used for sending the SRS, wherein the SRS resource used for sending the SRS has a corresponding relationship with the first information.

Optionally, the processing unit 410 is further used for: independent power control parameters are adopted to calculate the sending power for sending the SRS for different SRS resources in the SRS resource group.

Optionally, the power control parameter includes an open loop power control parameter and/or a closed loop power control parameter.

Optionally, the communication unit 420 is further used for: sending SRSs on different SRS resources in the SRS resource group by utilizing different sending beams.

It should be understood that the terminal device 400 may correspond to the terminal device in the above method implementation and may implement corresponding operations implemented by the terminal device. For the sake of brevity, it will not be repeated here.

Figure 5:
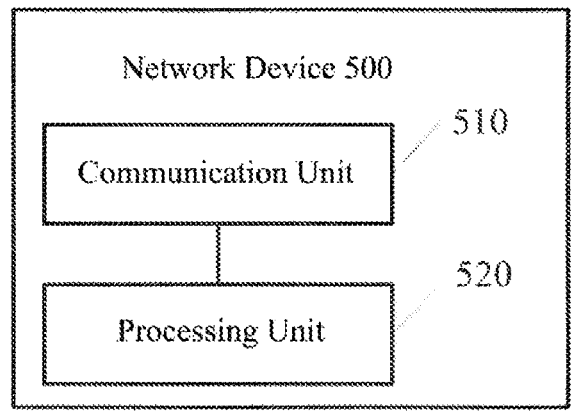
FIG. 5 is a schematic block diagram of a network device according to an implementation of the present disclosure.

FIG. 5 is a schematic block diagram of a network device 500 according to an implementation of the present disclosure. As shown in FIG. 5, the network device 500 includes a communication unit 510 and a processing unit 520.

The communication unit 510 is used for acquiring first information indicated by a terminal device, wherein the first information includes information of a sending power for sending a Sounding Reference Signal (SRS) by utilizing an SRS resource in a SRS resource group.

The processing unit 520 is used for determining a first SRS resource from the SRS resource group according to the information of the sending power.

The communication unit 510 is further used for indicating second information to the terminal device, wherein the second information is used for indicating the first SRS resource, so that the terminal device determines a transmission parameter for sending an uplink signal which is not an SRS according to the first SRS resource.

Optionally, the transmission parameter includes at least one of the following: a sending beam, a quantity of transmitting ports, and a precoding matrix.

Optionally, the information of the sending power includes: a quantized value of the sending power for sending the SRS by utilizing the SRS resource in the SRS resource group; or, a relative value of the sending power for sending the SRS by utilizing the SRS resource in the SRS resource group relative to a first sending power; or, information for indicating whether a same sending power is adopted to send SRSs on different SRS resources in the SRS resource group; or, information of a path loss estimation value used for calculating the sending power.

Optionally, the information of the path loss estimation value used for calculating the sending power includes: a quantized value of the path loss estimation value; or, a relative value of the path loss estimation value relative to a first path loss estimation value.

Optionally, the communication unit 510 is further used for: receiving the first information sent by the terminal device through an uplink physical channel; or, receiving the first information sent by the terminal device through high-level signaling; or, acquiring the first information indicated by the terminal device through the SRS resource used by the terminal device to send the SRS, wherein the SRS resource used by the terminal device to send the SRS has a corresponding relationship with the first information.

Optionally, the processing unit 520 is further used for: determining the first SRS resource according to receiving powers of SRSs received on different SRS resources in the SRS resource group and the information of the sending power.

It should be understood that the network device 500 may correspond to the network device in the above method implementation and may implement corresponding operations implemented by the network device. For the sake of brevity, it will not be repeated here.

Figure 6:
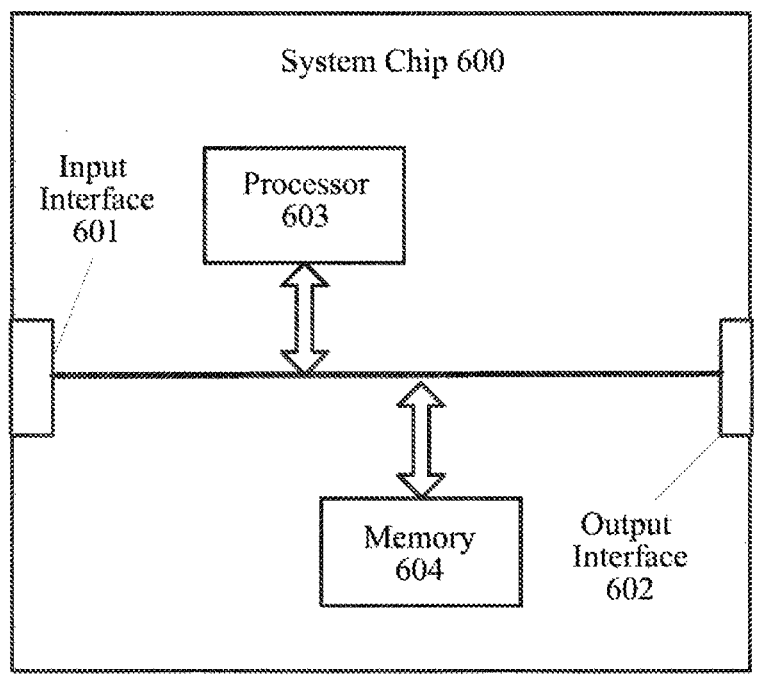
FIG. 6 is a schematic block diagram of a system chip according to an implementation of the present disclosure.

FIG. 6 is a schematic structural diagram of a system chip 600 according to an implementation of the present disclosure. The system chip 600 of FIG. 6 includes an input interface 601, an output interface 602, a processor 603, and a memory 604, which could be connected through internal communication connection lines. The processor 603 is used for executing codes in the memory 604.

Optionally, when the code is executed, the processor 603 implements the method implemented by the network device in the method implementations. For sake of conciseness, the specific description will not be repeated here.

Optionally, when the code is executed, the processor 603 implements the method implemented by the terminal device in the method implementations. For sake of conciseness, the specific description will not be repeated here.

Figure 7:
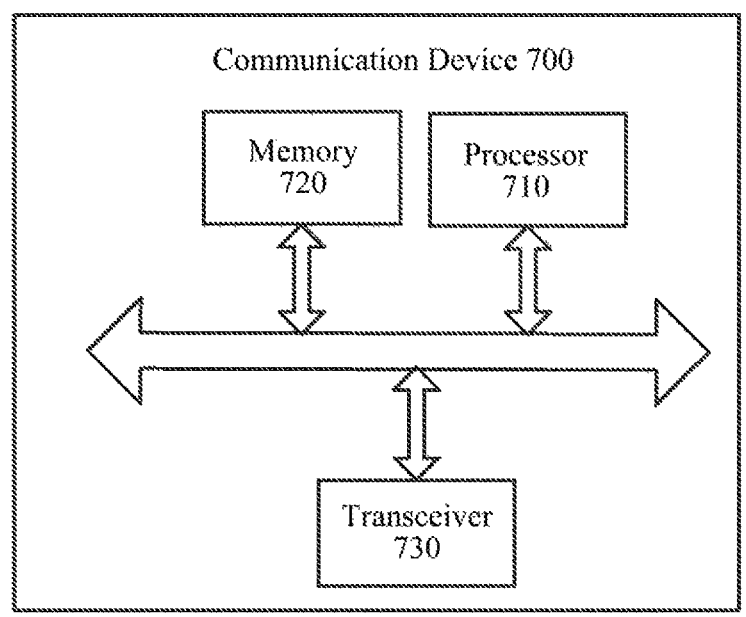
FIG. 7 is a schematic block diagram of a communication device according to an implementation of the present disclosure.

FIG. 7 is a schematic block diagram of a communication device 700 according to an implementation of the present disclosure. As shown in FIG. 7, the communication device 700 includes a processor 710 and a memory 720. The memory 720 may store program codes, and the processor 710 may execute the program codes stored in the memory 720.

Optionally, as shown in FIG. 7, the communication device 700 may include a transceiver 730, and the processor 710 may control the transceiver 730 to communicate with the external.

Optionally, the processor 710 may call the program codes stored in the memory 720 to perform corresponding operations of the network device in the method implementations, which will not be described here repeatedly for brevity.

Optionally, the processor 710 may call the program codes stored in the memory 720 to perform corresponding operations of the terminal device in the method implementations, which will not be described here repeatedly for brevity.

It should be understood that the processor in an implementation of the present invention may be an integrated circuit chip with a capability for processing signals. In the implementation process, the actions of the method implementations described above may be completed by integrated logic circuits of hardware in the processor or instructions in the form of software. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor or the processor may be any conventional processor or the like. The actions of the method disclosed in connection with the implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It should be understood that the memory in implementations of the present disclosure may be a transitory memory or non-transitory memory, or may include both transitory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, apparatus and method may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

The foregoing are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What I claim is:

1. A method for Sounding Reference Signal (SRS) communication, comprising:

determining, by a terminal device, a sending power for sending the SRS by utilizing an SRS resource in an SRS resource group; and indicating, by the terminal device, first information to a network device, wherein the first information comprises information about the sending power for sending the SRS by utilizing the SRS resource in the SRS resource group, wherein the information about the sending power for sending the SRS by utilizing the SRS resource in the SRS resource group comprises a relative value of the sending power for sending the SRS by utilizing the SRS resource in the SRS resource group relative to a first sending power, and wherein the relative value refers to a difference between the sending power for sending an SRS by using one SRS resource in the SRS resource group and the first sending power.

2. The method of claim 1, wherein the information about the sending power comprises:
a quantized value of the sending power for sending the SRS by utilizing the SRS resource in the SRS resource group.

3. The method of claim 1, wherein the first sending power is:
a sending power of a second uplink signal which is not an SRS; or,
a sending power for sending an SRS by utilizing a second SRS resource in the SRS resource group; or,
an average sending power for sending SRSs by utilizing SRS resources in the SRS resource group; or,
a reference sending power configured by the network device.

4. The method of claim 3, wherein the second SRS resource is an agreed SRS resource in the SRS resource group.

5. The method of claim 1, wherein the information about the sending power comprises: information for indicating whether a same sending power is adopted for sending SRSs on different SRS resources in the SRS resource group.

6. The method of claim 1, wherein the information about the sending power comprises:
information about a path loss estimation value used for calculating the sending power.

7. The method of claim 6, wherein the information about the path loss estimation value is:
a quantized value of the path loss estimation value; or,
a relative value of the path loss estimation value relative to a first path loss estimation value.

8. The method of claim 1, wherein indicating, by the terminal device, the first information to the network device, comprises:
sending, by the terminal device, the first information through an uplink physical channel; or,
sending, by the terminal device, the first information through high-level signaling; or,
indicating, by the terminal device, the first information through the SRS resource used for sending the SRS, wherein the SRS resource used for sending the SRS has a corresponding relationship with the first information.

9. The method of claim 1, wherein the method further comprises:
sending the SRS on different SRS resources in the SRS resource group by utilizing different sending beams.

10. A terminal device comprising a processor, a memory, and a transceiver, wherein the processor, the memory, and the transceiver communicate with each other through internal connection paths to transfer at least one of control or data signals;
the memory is used for storing instructions; and
the processor is used for performing following operations when executing the instructions stored in the memory:
determining a sending power for sending a Sounding Reference Signal (SRS) by utilizing an SRS resource in an SRS resource group; and
indicating first information to a network device, wherein the first information comprises information about the sending power for sending the SRS by utilizing the SRS resource in the SRS resource group,
wherein the information about the sending power for sending the SRS by utilizing the SRS resource in the SRS resource group comprises a relative value of the sending power for sending the SRS by utilizing the SRS resource in the SRS resource group relative to a first sending power, and
wherein the relative value refers to a difference between the sending power for sending an SRS by using one SRS resource in the SRS resource group and the first sending power.

11. The terminal device of claim 10, wherein the information about the sending power comprises:
a quantized value of the sending power for sending the SRS by utilizing the SRS resource in the SRS resource group.

12. The terminal device of claim 10, wherein the first sending power is:
a sending power of a second uplink signal which is not an SRS; or,
a sending power for sending an SRS by utilizing a second SRS resource in the SRS resource group; or,
an average sending power for sending SRSs by utilizing SRS resources in the SRS resource group; or,
a reference sending power configured by the network device.

13. The terminal device of claim 12, wherein the second SRS resource is an agreed SRS resource in the SRS resource group.

14. The terminal device of claim 10, wherein the information about the sending power comprises: information for indicating whether a same sending power is adopted for sending SRSs on different SRS resources in the SRS resource group.

15. The terminal device of claim 10, wherein the information about the sending power comprises:
information about a path loss estimation value used for calculating the sending power.

16. The terminal device of claim 15, wherein the information about the path loss estimation value is:
a quantized value of the path loss estimation value; or,
a relative value of the path loss estimation value relative to a first path loss estimation value.

17. The terminal device of claim 10, wherein the processor is further used for:
sending the first information through an uplink physical channel; or,
sending the first information through high-level signaling; or,
indicating the first information through the SRS resource used for sending the SRS, wherein the SRS resource used for sending the SRS has a corresponding relationship with the first information.

18. The terminal device of claim 10, wherein the processor is further used for:
sending the SRS on different SRS resources in the SRS resource group by utilizing different sending beams.

* * * * *